United States Patent
Yuan et al.

(10) Patent No.: US 10,808,052 B2
(45) Date of Patent: Oct. 20, 2020

(54) SPHERICAL SUPPORTED TRANSITION METAL CATALYST

(71) Applicant: PetroChina Company Limited, Beijing (CN)

(72) Inventors: Yuan Yuan, Beijing (CN); Tianxu Sun, Beijing (CN); Jianjun Yi, Beijing (CN); Shan Xue, Beijing (CN); Kefeng Wang, Beijing (CN); Kuilong Tan, Beijing (CN); Li Wang, Beijing (CN); Rongbo Li, Beijing (CN)

(73) Assignee: PetroChina Company Limited, Beijing (CN)

( * ) Notice: Subject to any disclaimer, the term of this patent is extended or adjusted under 35 U.S.C. 154(b) by 404 days.

(21) Appl. No.: 15/747,268

(22) PCT Filed: Feb. 19, 2016

(86) PCT No.: PCT/CN2016/074130
§ 371 (c)(1),
(2) Date: Jan. 24, 2018

(87) PCT Pub. No.: WO2017/054398
PCT Pub. Date: Apr. 6, 2017

(65) Prior Publication Data
US 2018/0244812 A1    Aug. 30, 2018

(30) Foreign Application Priority Data

Sep. 28, 2015  (CN) ........................... 2015 1 0627404
Sep. 28, 2015  (CN) ........................... 2015 1 0627473

(51) Int. Cl.
*C08F 10/02*    (2006.01)
*C08F 4/02*    (2006.01)
(Continued)

(52) U.S. Cl.
CPC ............... *C08F 10/02* (2013.01); *C08F 4/02* (2013.01); *C08F 10/06* (2013.01); *C08F 110/02* (2013.01);
(Continued)

(58) Field of Classification Search
None
See application file for complete search history.

(56) References Cited

U.S. PATENT DOCUMENTS 2,924,593 A    2/1960  Breslow
4,542,199 A    9/1985  Kaminsky et al.
(Continued)

FOREIGN PATENT DOCUMENTS

CN    101058411 A    10/2007
CN    101058413 A    10/2007
(Continued)

OTHER PUBLICATIONS

JP 11-343307, Machine-generated English translation, claims (Year: 1999).*
(Continued)

*Primary Examiner* — Yun Qian
(74) *Attorney, Agent, or Firm* — Hamilton, Brook, Smith & Reynolds, P.C.

(57) ABSTRACT

The present invention provides a spherical supported transition metal catalyst. The catalyst carrier is a spherical titanium/zirconium hydrophosphate compound, the primary catalyst is a transition metal compound, the co-catalyst is methylaluminoxane; the spherical titanium/zirconium hydrophosphate compound comprises one or several combinations of titanium hydrophosphate, modified titanium hydrophosphate and zirconium hydrophosphate. The present invention also provides a preparation method of said spherical supported transition metal catalyst and a use thereof in (Continued)

olefin polymerization, as well as the spherical titanium/zirconium hydrophosphate compound and its preparation method. The spherical, supported transition metal catalyst in the present invention has a high catalytic activity, and the polymer particles obtained have good morphology.

11 Claims, 4 Drawing Sheets

(51) Int. Cl.
| | | |
|---|---|---|
| C08F 110/02 | (2006.01) | |
| C08F 110/06 | (2006.01) | |
| C08F 10/06 | (2006.01) | |
| C08F 4/6592 | (2006.01) | |
| C08F 4/659 | (2006.01) | |

(52) U.S. Cl.
CPC .......... *C08F 110/06* (2013.01); *C08F 4/6592* (2013.01); *C08F 4/65912* (2013.01); *C08F 4/65916* (2013.01); *C08F 4/65925* (2013.01); *C08F 4/65927* (2013.01); *C08F 2410/03* (2013.01); *C08F 2420/02* (2013.01)

(56) References Cited

U.S. PATENT DOCUMENTS

| | | | |
|---|---|---|---|
| 4,544,762 | A | 10/1985 | Kaminsky |
| 5,635,437 | A | 6/1997 | Burkhardt et al. |
| 2002/0035227 | A1 | 3/2002 | Uehara et al. |
| 2003/0109377 | A1 | 6/2003 | Chan et al. |
| 2004/0097364 | A1 | 5/2004 | Gao et al. |

FOREIGN PATENT DOCUMENTS

| | | | |
|---|---|---|---|
| CN | 101270131 A | 9/2008 | |
| CN | 101580561 A | 11/2009 | |
| CN | 101797511 A | 8/2010 | |
| CN | 101880338 A | 10/2010 | |
| CN | 102731688 A | 10/2012 | |
| CN | 103261239 A | 8/2013 | |
| CN | 103626145 A | 3/2014 | |
| CN | 104588049 A | 6/2015 | |
| DE | 3835044 A1 | 4/1990 | |
| EP | 0210615 A2 | 2/1987 | |
| EP | 0351391 A2 | 1/1990 | |
| EP | 0416815 A2 | 3/1991 | |
| EP | 0420436 A1 | 4/1991 | |
| EP | 0351392 B2 | 3/2005 | |
| EP | 2915826 A1 | 9/2015 | |
| JP | 11-343307 | * 12/1999 | ............... C08F 4/64 |
| JP | 2014133671 A | 7/2014 | |
| WO | 9523816 | 9/1995 | |

OTHER PUBLICATIONS

Brintzinger, Organometallics 16, 3413-3420 (Year: 1997).*
JP 11-343307, Machine-generated English translation, description (Year: 1997).*
Chinese Search Report for Chinese Application No. 2015106274048, "Spherical supported type non-metallocene transition metal catalyst", dated Sep. 7, 2018.
Chinese Search Report for Chinese Application No. 2015106274739, "Spherical supported type metallocene catalyst", dated Aug. 27, 2018.
International Preliminary Report on Patentability for International Application No. PCT/CN2016/074130, "Spherical Supported Transition Metal Catalyst", dated Apr. 3, 2018.
Rui, Z., et al., "Hydrothermal Synthesis and Characterization of the Layered Compound of α-Zirconium Hydrophosphate", Fire Safety Science, 10(2): 1-3 (2001).
Ji, Y., et al., "Titanium phosphonate-supported palladium catalyst for the hydrogenation of acetophenone with one-phase catalysis and two-phase separation", Applied CatalysisA: General, 332 (2007) 247-256.
Wild, F., et al., "Synthesis and Molecular Structures of Chiral ansa-Titanocene Derivatives with Bridged Tetrahydroindenyl Ligands", Journal of Organometallic Chemistry, 232 (1982) 233-247.
Shapiro, P.J., et al., "[{η5-C5Me4Si(η1-NCMe3)}PMe3)ScH]2: A Unique Example of a Single-Component α-Olefin Polymerization Catalyst", Organometallics 1990, 9, 867-869.
Cozzo, P.G., et al., "(Hydroxyphenyl)oxazoline: A Novel and Remarkably Facile Entry into the Area of Chiral Cationic Alkylzirconium Complexes Which Serve as Polymerization Catalysts", Organometallics 1995, 14, 4994-4996.
Ewen, J.A., et al., "Syndiospecific Propylene Polymerizations with Group 4 Metallocenes", J. Am. Chem. Soc. 1988, 110, 6255-6256.
Kaminsky, W., et al., "Polymerization of Propene and Butene with a Chiral Zirconocene and Methylalumoxane as Cocatalyst", Angew. Chem. Inc. Ed. Engl. 24 (1985), 507-508.
Ewen, J.A., "Mechanisms of Stereochemical Control in Propylene Polymerizations with Soluble Group 4B Metallocene/Methylalumoxane Catalysts", J. Am. Chem. Soc. 1984, 106, 6355-6364.
Younkin T.R., et al., "Neutral, Single-Component Nickel (II) Polyolefin Catalysts That Tolerate Heteroatoms", Science 287, 460 (2000).
Johnson, L.K., et al., "New Pd(II)- and (Ni(II)-Based Catalysts for Polymerization of Ethylene and α-Olefins", J. Am. Chem. Soc. 1995, 117, 6414-6415.
Britovsek, G.J.P., et al., "Novel olefin polymerization catalysts based on iron and cobalt", Chem. Commun., 1998, 849-850.
Matsui, S., et al., "New Bis(salicylaldiminato) Titanium Complexes for Ethylene Polymerization", Chemistry Letters 1999, 1065-1066.
Small, B.L., et al., "Highly Active Iron and Cobalt Catalysts for the Polymerization of Ethylene", J. Am. Chem. Soc. 1998, 120, 4049-4050.
Nishida, H., et al., "Polystyrene-supported metallocene catalysts for olefin polymerizations", Macromol. Rapid Commun. 16, 821-830 (1995).
Kageyama, K., et al., "Extrusion Polymerization: Catalyzed Synthesis of Crystalline Linear Polyethylene Nanofibers Within a Mesoporous Silica", Science, 285, 2113 (1999).
Guo, C-Y., et al., "Preparation and properties of polyethylene/montmorillonite nanocomposites formed via ethylene copolymerization", Polym Int. 2009; 58: 1319-1325.
Chen, Y-X., et al., "Heptane-Soluble Homogeneous Zirconocene Catalyst: Synthesis of a Single Diastereomer, Polymerization Catalysis, and Effect of Silica Supports", Journal of Polymer Science: Part A: Polymer Chemistry, vol. 33, 2093-2108 (1995).
Ma, Z., et al., "Preparation of silica-supported late transition metal catalyst and ethylene polymerization", Polym Int 51: 349-352 (2002).
AlObaidi, F., et al., "Ethylene Polymerization with Silica-Supported Nickel-Diimine Catalyst: Effect of Support and Polymerization Conditions on Catalyst Activity and Polymer Properties", Macromol. Chem. Phys. 2003, 204, 1653-1659.
Guo, C., et al., "Preparation and Characterization of SBA-15 Supported Iron(II)-Bisimine Pyridine Catalyst for ethylene polymerization", Journal of Polymer Science Part A Polymer Chemistry vol. 42, 4830-4830 (2004).
Collins, S., et al., "Polymerization of Propylene Using Supported, Chiral, ansa-Metallocene Catalysts: Production of Polypropylene with Narrow Molecular Weight Distributions", Macromolecules 1992, 25, 1780-1785.
Xu, R., et al., Preparation of Spherical MgCl2-Supported Late-Transition Metal Catalysts for Ethylene Polymerization, Macromol Chem Phys, 2006, 207, 779-786.
Nakayama, Y., et al., "MgCl2/R'nAl(OR)3-n: An Excellent Activator/Support for Transition-Metal Complexes for Olefin Polymerization", Chem. Eur. J. 2006, 12, 7546-7556.
Choi, Y., et al., Preparation of Polyethylene/Montmorillonite Nanocomposites Through in situ Polymerization Using a Montmorillonite-Supported Nickel Diimine Catalyst, Macromol. Chem. Phys. 2010, 211, 1026-1034.

(56) References Cited

OTHER PUBLICATIONS

Zou, X-C., et al., "Organic-Inorganic Hybrid Support-Zirconium Poly (Styrene-Phenylvinylphosphonate)-Phosphate: Application for Heterogeeous Olefin Epoxidation", Chinese Journal of Inorganic Chemistry, 28(5): 1031-1037 (2012).
International Search Report for International Application No. PCT/CN2016/074130, "Spherical Supported Transition Metal Catalyst", dated Jul. 4, 2016.

* cited by examiner

SPHERICAL SUPPORTED TRANSITION METAL CATALYST

RELATED APPLICATIONS

This application is the U.S. National Stage of International Application No. PCT/CN2016/074130, filed Feb. 19, 2016, which designates the U.S., published in Chinese, and claims priority under 35 U.S.C. §§ 119 or 365(c) to Chinese Application No. 201510627404.8, filed Sep. 28, 2015 and Chinese Application No. 201510627473.9 filed on Sep. 28, 2015. The entire teachings of the above applications are incorporated herein by reference.

FIELD OF THE INVENTION

The present invention belongs to the field of olefin polymerization catalysts, and more particularly to a spherical supported transition metal catalyst.

BACKGROUND OF THE INVENTION

The use of metallocene compounds having Group IVB transition metals as central metals in the catalytic polymerization of olefins can be dated back to the early 1960s, and U.S. Pat. No. 2,924,593 discloses the catalytic polymerization of ethylene using zirconocene dichloride with alkyl aluminum as a co-catalyst. In the late 1970s, as methylaluminoxane (MAO) was found to effectively increase the activity of metallocene compounds to catalyze the polymerization of olefins, metallocene compound-MAO system based metallocene catalysts were developed rapidly: Hoechst applied for a key patent for a high-activity zirconocene catalyst and methylaluminoxane co-catalyst in the early 1980s (U.S. Pat. Nos. 4,542,199A, 4,544,762A); chiral bridged metallocene compounds were synthesized in 1982 (Journal of Organometallic Chemistry, 232 (1982) 233-247); in 1984, Exxon reported the use of an ansa-[Et(Ind)2TiCl2]/MAO catalyst to obtain isotactic and atactic mixed polypropylenes (J. Am. Chem. SOC. 1984, 106, 6355-6364), and subsequently the first metallocene catalyst for producing isotactic polypropylene was found (Angew. Chem. Inr. Ed. Enyl. 24 (1985) No. 6, 507-508); Hoechst obtained a patent for the preparation of cyclic olefin copolymers using metallocene catalysts (DE3835044A1). Idemitsu produced syndiotactic polystyrene with a half-metallocene catalyst and applied for a patent (EP0210615A2). In 1988, Fina reported a bridged cyclopentadienylzirconium compound having a fluorene ring with Cs symmetry (J. Am. Chem. SOC. 1988, 110, 6255-6256), which can catalyze the syndiotactic polymerization of propylene, and Fina obtained patents for the metallocene catalyst and syndiotactic polypropylene (EP0351391A2, EP0351392). The constrained geometry metallocene compound was firstly reported in 1990 (Organometallics 1990, 9, 867-869), and almost at the same time, Exxon (EP0420436A1), and Dow (EP0416815A2) proposed patents for constrained geometry metallocene catalysts.

Non-metallocene transition metal catalysts for olefin polymerization refer to organometallic complexes which do not contain cyclopentadienyl group and have oxygen, nitrogen, carbon, sulfur or the like as coordination atoms and transition metal elements as metal centers, and are capable of catalyzing the polymerization of olefins. The non-metallocene organometallic olefin polymerization catalysts do not only have the characteristics of metallocene catalysts such as high activity and single activity center, but also have the properties of living polymerization, copolymerization of olefins and polar monomers, and synthesis of highly branched olefin homopolymers. The use of non-metallocene transition metal compounds having Group IVB-Group VIII transition metals as central metals and α-diimine, pyridinediimine, salicylaldimine, and β-diketimine as ligands in catalyzing the polymerization of olefins were already reported extensively; in 1995, α-diiminenickel-based catalysts containing substitutes of large steric hindrance were found to be capable of catalyzing the polymerization of ethylene with a high activity to produce high molecular weight polyethylene (J. Am. Chem. Soc. 1995, 117, 6414-6415); in 1995, studies on transition metal complexes having bis(salicylaldimine) type ligands used as catalysts for the polymerization of ethylene was reported (Organometallics 1995, 14, 4994-4996), and then a series of new non-metallocene early transition metal catalysts for olefin polymerization having Group IVB metal atoms as centers were developed, of which FI catalysts are the representative (Chemistry Letters, 28 (1999) No. 10, 1065-1066); in 1998, two research groups each independently reported that tridentate pyridinediimine compounds of the late transition metal iron and cobalt could catalyze the high polymerization or oligomerization of ethylene, with catalytic activity comparable to that of metallocene catalysts (J. Am. Chem. Soc. 1998, 120, 4049-4050; Chem. Commun., 1998, 849-850). In 2000, a single-component neutral nickel catalyst containing salicylaldehyde ligands was found to be able to catalyze the polymerization of ethylene and the copolymerization of ethylene with polar monomers (Science 287, 460 (2000)).

In the system of metallocene catalysts or non-metallocene transition metal catalysts, a slight change in ligand structure can cause a great change in the catalytic performance of the catalysts. By adjusting the structure of the catalyst ligand, an effect that the conventional Zeigler-Natta catalyst cannot achieve can be achieved, producing polyolefins with different properties. However, although the transition metal catalyst has unique performance compared with the conventional Ziegler-Natta catalyst, its application in the industrial field is greatly limited, since it is difficult to control the morphology of the product and there is a serious phenomenon of sticking to reactor when the non-supported transition metal catalyst is used in catalyzing the polymerization of the olefin.

In order to improve the morphology of the polymer, to increase the bulk density of the polymer, and to control the particle size distribution of the polymer easily, so that the transition metal catalysts are applicable for the existing olefin polymerization apparatuses and processes, an easy way is to support the transition metal catalyst system. Such technique has been used in metallocene catalysts to facilitate the industrial use of metallocene catalysts. There are many carriers that can be used for the metallocene catalysts for olefin polymerization, and the conventional carrier is mainly silica gel carrier ($SiO_2$). The supported metallocene catalyst using silica gel as a carrier are disclosed in a large number of articles and patents (Journal of Polymer Science: Part A Polymer Chemistry, Vol. 33, 2093-2108 (1995); U.S. Pat. No. 5,635,437A). Moreover, materials such as molecular sieves (Science 285, 2113 (1999), montmorillonite (Polym. Int., 2009, 58, 1319-1325) and polystyrene (Macromol. Rapid Commun., 16, 821-830 (1995)) are also used as carriers for supported metallocene catalysts. However, as compared with silica gel, these materials are deficient, and thus silica gel carriers are still primarily used in industrial applications at present. As compared with metallocene catalysts, the supported non-metallocene transition metal catalysts are less used industrially, and silica gel carriers are generally used as the carriers (Macromol. Chem. Phys. 2003, 204, 1653-1659; Polym. Int. 51: 349-352 (2002)).

SUMMARY OF THE INVENTION

In order to overcome the above problems, it is an object of the present invention to provide a spherical supported transition metal catalyst which exhibits a good catalytic activity in the polymerization of olefins.

It is another object of the present invention to provide a preparation method of the spherical supported transition metal catalyst as described above.

It is another object of the present invention to provide a use of the spherical supported transition metal catalyst as described above in the polymerization of olefins.

It is another object of the present invention to provide a polyolefin-nanocomposite produced by polymerization of olefins catalyzed with the spherical supported transition metal catalyst as described above.

It is another object of the present invention to provide a spherical titanium/zirconium hydrophosphate compound carrier for the spherical supported transition metal catalyst as described above.

It is another object of the present invention to provide a preparation method of the spherical titanium/zirconium hydrophosphate compound carrier as described above.

In order to achieve the above objects, the present invention provides a spherical supported transition metal catalyst, wherein a carrier of the catalyst is a spherical titanium/zirconium hydrophosphate compound, a primary catalyst of the catalyst is a transition metal compound, and a co-catalyst of the catalyst is methylaluminoxane; and wherein the spherical titanium/zirconium hydrophosphate compound comprises one or more of titanium hydrophosphate ($Ti(HPO_4)_2$), modified titanium hydrophosphate and zirconium hydrophosphate ($Zr(HPO_4)_2$).

The content of the central metal of the transition metal compound in the catalyst is 0.1 wt % to 0.4 wt %, and the aluminum content in the catalyst is 5 wt % to 20 wt %.

The titanium/zirconium hydrophosphate compound is an acidic clay material, including titanium hydrophosphate, zirconium hydrophosphate, organic titanium hydrophosphonate (e.g., titanium phenylphosphonate), organo-modified titanium hydrophosphate prepared by means of co-precipitation or ion exchange (e.g., titanium phenylphosphonate hydrophosphate), and acid-modified titanium phosphate treated with strong or mediate strong acid (e.g., sulfuric acid acidified titanium hydrophosphate). The titanium/zirconium hydrophosphate compound has a layered structure and strong acidity, and has a potential application value in the fields of ion exchange, intercalation materials, rubber and plastics additives, and the like.

For a catalyst carrier for polyolefin, it is generally believed that one should try to avoid the use of substances containing too many hydroxyl groups on the surface, because the hydroxyl group is a protonic acid; when the surface of the carrier contains a large amount of hydroxyl groups, the hydroxyl groups tend to react with the ligands of the transition metal catalyst, so that they (the transition metal compound) fall off the catalyst, resulting in deactivation of the catalyst (Macromolecules 1992, 25, 1780-1785). For example, in the prior art, there is a related report about a catalyst for olefin polymerization produced by supporting metallocene using zirconium phenylphosphonate ($\alpha$-Zr$(O_3PPh)_2$) as a carrier (CN101580561A). The carrier in this patent is a substance in which the hydroxyl group of zirconium hydrophosphate is substituted with a phenyl group, and the aim of the substitution is to avoid the phenomenon that a part of the metallocene catalyst decomposes due to the presence of hydroxyl groups. However, the polymerization activity of the catalyst made from organozirconium phenylphosphonate as the carrier is still not ideal. The technical solution provided in the present invention is distinguishable from the prior art described above in that on the one hand, the carrier may be selected from titanium hydrophosphate, modified titanium hydrophosphate and zirconium hydrophosphate; on the other hand, as the primary catalyst, the non-metallocene transition metal compound may be used. After a series of experiments, the inventor found: (1) when unsubstituted titanium/zirconium hydrophosphate (hydroxyl groups being completely retained) or partially substituted titanium hydrophosphate (hydroxyl groups being partially retained) is used as the carrier of the catalyst for olefin polymerization, the polymerization activity of the catalyst is not as desired by the prior art, in which the catalytic activity is reduced or even deactivated, but instead the catalyst is allowed to have an unexpected high catalytic activity (the occurrence of the above phenomenon may be related to the physical and chemical properties of the titanium/zirconium hydrophosphate compound); and (2) the supported transition metal catalyst produced from titanium hydrophosphate with hydroxyl groups completely substituted has excellent catalytic activity, as compared with the supported metallocene catalyst made from the organozirconium phenylphosphonate in prior art.

In the spherical supported transition metal catalyst as described above, preferably, the modified titanium hydrophosphate comprises an organo-modified titanium hydrophosphate (a compound in which hydroxyl groups in titanium hydrophosphate are partially or completely substituted, preferably, a compound in which hydroxyl groups are partially substituted) or an acid-modified titanium phosphate; further preferably, the organo-modified titanium hydrophosphate comprises titanium phenylphosphonate ($Ti(C_6H_5PO_3)_2$) and titanium phenylphosphonate hydrophosphate ($Ti(C_6H_5PO_3)_x(HPO_4)_{2-x}$, $0<x<2$, preferably, $0.5 \le x \le 1.5$); more preferably, the acid-modified titanium phosphate comprises sulfuric acid acidified titanium hydrophosphate.

In the spherical supported transition metal catalyst as described above, preferably, the transition metal compound comprises one or more of a metallocene compound and a non-metallocene transition metal compound; the metallocene compound is a metallocene compound having Group IVB transition metal as a central atom; and the non-metallocene transition metal compound is a non-metallocene transition metal compound having Group IVB-Group VIII transition metal as a central atom and $\alpha$-diimine, pyridinediimine, salicylaldimine or $\beta$-diketimine as a ligand.

In the spherical supported transition metal catalyst as described above, preferably, the metallocene compound comprises one or more of a non-bridged metallocene compound, a non-bridged half-metallocene compound, a bridged metallocene compound and a constrained geometry metallocene compound. Preferably, the non-bridged metallocene compound comprises: zirconocene dichloride ($Cp_2ZrCl_2$), bisindenylzirconium dichloride ($Ind_2ZrCl_2$), bis(butylcyclopentadienyl)zirconium dichloride (($BuCp)_2ZrCl_2$), fluorenyl cyclopentadienylzirconium dichloride ($FluCpZrCl_2$), hafnocene dichloride ($Cp_2HfCl_2$), bis(butylcyclopentadienyl)hafnium dichloride (($BuCp)_2HfCl_2$) or dimethylbis(butylcyclopentadienyl)hafnium (($BuCp)_2Hf(CH_3)_2$). Preferably, the non-bridged half-metallocene compound comprises: cyclopentadienyltitanium trichloride (CpTiCl₃), indenyltitanium trichloride (IndTiCl₃), pentamethylcyclopentadienyltitanium trichloride (Cp*TiCl₃) or pentamethylcyclopentadienylzirconium trichloride (Cp*ZrCl₃). Preferably, the bridged metallocene compound comprises: dimethyl(bis(cyclopentadienyl)silyl)zirconium dichloride (Me₂SiCp₂ZrCl₂), dimethyl(bis(9-fluorenyl)silyl)zirconium dichloride (Me₂Si(9-Flu)₂ZrCl₂), isopropylidenebis(9-fluorenyl)zirconium dichloride (iPr(9-Flu)₂ZrCl₂), isopropylidene(cyclopentadienyl)(9-fluorenyl)zirconium dichloride (iPrCp(9-Flu)ZrCl₂), diphenylmethylidene(cyclopentadienyl)(9-fluorenyl)zirconium dichloride (Ph₂CCp(9-Flu)ZrCl₂), rac-ethylenebisindenylzirconium dichloride (rac-EtInd₂ZrCl₂), rac-ethylenebis(tetrahydroindenyl)zirconium dichloride (rac-Et(IndH₄)₂ZrCl₂), rac-dimethyl(bis(2-methyl-4,5-benzoindenyl)silyl)zirconium dichloride (rac-Me₂Si(2-Me-4,5-BenzInd)₂ZrCl₂) or rac-dimethyl(bis(2-methyl-4-phenylindenyl)silyl)zirconium dichloride (rac-Me₂Si(2-Me-4-PhInd)₂ZrCl₂). Preferably, the constrained geometry metallocene compound comprises [Me₂Si(Me₄Cp)(N$^t$Bu)]TiCl₂.

In the spherical supported transition metal catalyst as described above, preferably, the central metal of the non-metallocene transition metal compound comprises titanium, zirconium, hafnium, chromium, vanadium, iron, cobalt, nickel or palladium. Preferably, the non-metallocene transition metal compound comprises one or more of α-diiminenickel, α-diiminepalladium, α-diiminevanadium, pyridinediiminecobalt, pyridinediiminevanadium, salicylaldiminetitanium, salicylaldiminezirconium, salicylaldiminevanadium and β-diketiminechromium.

Among these, the structure of α-diiminenickel, α-diiminepalladium and α-diiminevanadium can be represented by

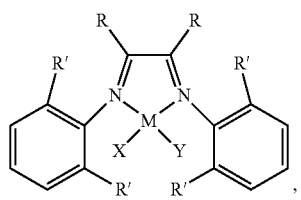

wherein M is nickel, palladium or vanadium; X and Y are chloro, bromo or methyl; R is hydrogen, hydrocarbonyl, substituted hydrocarbonyl, aryl or substituted aryl; R' is hydrocarbonyl, substituted hydrocarbonyl, aryl or substituted aryl.

The structure of pyridinediimineiron, pyridinediiminecobalt and pyridinediimine vanadium can be represented by

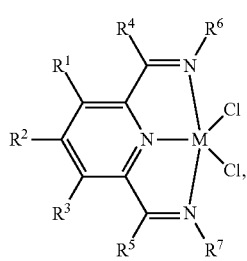

wherein M is iron, cobalt or vanadium; $R_1$, $R_2$, $R_3$, $R_4$ and $R_5$ are each independently hydrogen, hydrocarbonyl or substituted hydrocarbonyl; $R_6$ and $R_7$ are each independently aryl or substituted aryl.

The structure of salicylaldiminetitanium and salicylaldiminezirconium can be represented by

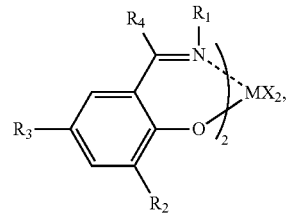

wherein M is titanium or zirconium; $R_1$, $R_2$, $R_3$ and $R_4$ are each independently hydrogen, hydrocarbonyl or substituted hydrocarbonyl, aryl or substituted aryl; X is chlorine, bromine or methyl.

The structure of salicylaldiminevanadium can be represented by

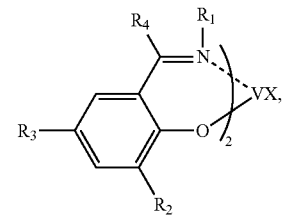

wherein $R_1$, $R_2$, $R_3$ and $R_4$ are each independently hydrogen, hydrocarbonyl or substituted hydrocarbonyl, aryl or substituted aryl; X is chlorine or oxygen.

The structure of β-diketiminechromium can be represented by

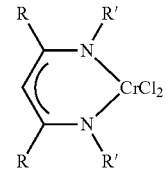

wherein R is hydrocarbonyl or substituted hydrocarbonyl; R' is aryl or substituted aryl.

The present invention further provides a method for preparing the spherical supported transition metal catalyst, comprising the steps of: dispersing the spherical titanium/zirconium hydrophosphate compound carrier in toluene and adding thereto methylaluminoxane for treatment to give the activated spherical titanium/zirconium hydrophosphate compound carrier; dissolving the transition metal compound in toluene and adding thereto methylaluminoxane for treatment to give the activated transition metal compound solution; mixing the activated spherical titanium/zirconium hydrophosphate compound carrier with the activated transition metal compound solution and stirring to give a mixed system, washing and filtering the mixed system to obtain a solid precipitate, and drying the solid precipitate to obtain the spherical supported transition metal catalyst.

In the method for preparing the spherical supported transition metal catalyst as described above, preferably, the mass ratio of the transition metal compound to the spherical titanium/zirconium hydrophosphate compound carrier is (0.01-0.03):1.

In the method for preparing the spherical supported transition metal catalyst as described above, preferably, in the step of preparing the activated spherical titanium/zirconium hydrophosphate compound carrier, the molar amount of methylaluminoxane is on aluminum basis, and the amount ratio of methylaluminoxane to the spherical titanium/zirconium hydrophosphate compound carrier is 3 to 9 mmol/g.

In the method for preparing the spherical supported transition metal catalyst as described above, preferably, in the step of preparing the activated transition metal compound solution, the molar amount of methylaluminoxane is on aluminum basis, and the amount ratio of methylaluminoxane to the transition metal compound is 0.015 to 0.3 mol/g.

In the method for preparing the spherical supported transition metal catalyst as described above, preferably, the methylaluminoxane is added for treatment under the condition of stirring at 20° C. to 50° C. for 20 minutes to 2 hours.

In the method for preparing the spherical supported transition metal catalyst as described above, preferably, the stirring is carried out under the condition of stirring at 20° C. to 50° C. for 30 minutes to 3 hours.

In the method for preparing the spherical supported transition metal catalyst as described above, preferably, the solvent for washing is toluene or hexane.

In the method for preparing the spherical supported transition metal catalyst as described above, preferably, the preparation of the activated spherical titanium/zirconium hydrophosphate compound carrier and/or the activated transition metal compound solution is carried out under protection by inert gas.

The present invention further provides a use of the spherical supported transition metal catalyst as described above in olefin polymerization.

The present invention further provides a polyolefin-nanocomposite produced by olefin polymerization catalyzed with the spherical supported transition metal catalyst as described above, wherein, the titanium/zirconium hydrophosphate compound is dispersed in the polymer matrix in a nano-scale.

The present invention further provides a spherical titanium/zirconium hydrophosphate compound carrier for the spherical supported transition metal catalyst as described above, wherein the spherical titanium/zirconium hydrophosphate compound comprises one or more of titanium hydrophosphate, modified titanium hydrophosphate and zirconium hydrophosphate; the spherical titanium/zirconium hydrophosphate compound carrier is in the form of microsphere with an average particle size of 5 to 50 μm, a specific surface of 100 to 400 m$^2$/g and a specific pore volume of 0.8 to 1.6 cc/g.

The spherical titanium/zirconium hydrophosphate compound carrier provided in the present invention has a good spherical morphology. The spherical supported catalyst thus obtained, when used for olefin polymerization, can produce polymer particles with good morphology, facilitate the transport of the polymer in the reactor and avoid sticking to the reactor or the pipe.

In the spherical titanium/zirconium hydrophosphate compound carrier as described above, preferably, the modified titanium hydrophosphate comprises an organo-modified titanium hydrophosphate (a compound in which hydroxyl groups in titanium hydrophosphate are partially or completely substituted) or an acid-modified titanium phosphate; further preferably, the organo-modified titanium hydrophosphate comprises titanium phenylphosphonate ($Ti(C_6H_5PO_3)_2$) and titanium phenylphosphonate hydrophosphate ($Ti(C_6H_5PO_3)_x(HPO_4)_{2-x}$, $0<x<2$, preferably, $0.5 \leq x \leq 1.5$); more preferably, the acid-modified titanium phosphate comprises sulfuric acid acidified titanium hydrophosphate.

The present invention further provides a method for preparing the spherical titanium/zirconium hydrophosphate compound carrier, comprising the steps of: mixing the titanium/zirconium hydrophosphate compound with water to form a mixture, wherein the mass ratio of titanium/zirconium hydrophosphate compound to water in the mixture is (0.05-0.2):1; emulsifying the mixture to obtain a slurry of titanium/zirconium hydrophosphate compound; drying the slurry of titanium/zirconium hydrophosphate compound by spraying to obtain particles of the spherical titanium/zirconium hydrophosphate compound; vacuum drying the particles of the spherical titanium/zirconium hydrophosphate compound at 100° C. to 200° C. for dehydration and then cooling to room temperature under an inert atmosphere to obtain the spherical titanium/zirconium hydrophosphate compound carrier.

In the method for preparing the spherical titanium/zirconium hydrophosphate compound carrier, preferably, when the mixture is emulsified, the emulsification may be performed with an emulsifying shearing machine.

The spherical supported transition metal catalyst made from the spherical titanium/zirconium hydrophosphate compound as a carrier provided according to the present invention has the advantages of high polymerization activity, low amount of co-catalyst used during polymerization, and good morphology of polymer particles.

DETAILED DESCRIPTION OF THE INVENTION

In order to understand the technical features, objectives, and advantageous effects of the present invention more clearly, the technical solutions of the present invention will now be described in detail, but it should not be construed as limiting the implementable scope of the present invention.

Example 1

Figure 1:
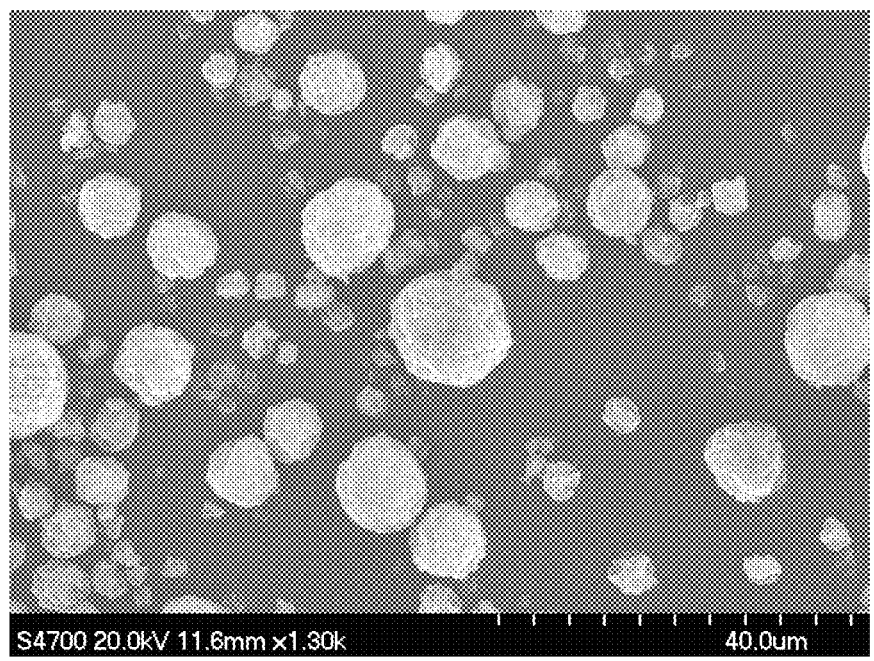
FIG. 1 is a scanning electron micrograph of the spherical titanium hydrophosphate carrier produced in Example 1.

This example provides a spherical titanium hydrophosphate carrier, which is specifically produced by:

accurately weighing 20 g of titanium hydrophosphate $(Ti(HPO_4)_2)$, adding thereto 100 g of deionized water, and treating this mixture system with a shear emulsifier at a rotor speed of 10,000 rpm for 30 min, to give a white milky titanium hydrophosphate suspension;

molding the titanium hydrophosphate suspension by a spray dryer having an inlet temperature of 190° C. and an outlet temperature of 110° C.;

heating the obtained solid powder to 160° C. and vacuum drying for 6 h, and then naturally cooling to room temperature under nitrogen protection, to give a spherical titanium hydrophosphate carrier product, designated as sTiP-1 (FIG. 1 is a scanning electron micrograph of sTiP-1).

Example 2

This example provides a spherical titanium hydrophosphate carrier, which is specifically produced by:

accurately weighing 10 g of titanium hydrophosphate $(Ti(HPO_4)_2)$, adding thereto 100 g of deionized water, and treating this mixture system with a shear emulsifier at a rotor speed of 10,000 rpm for 30 min, to give a white milky titanium hydrophosphate suspension;

molding the titanium hydrophosphate suspension a spray dryer having an inlet temperature of 200° C. and an outlet temperature of 100° C.;

heating the obtained solid powder to 140° C. and vacuum drying for 6 h, and then naturally cooling to room temperature under nitrogen protection, to give a spherical titanium hydrophosphate carrier product, designated as sTiP-2.

Example 3

This example provides a spherical titanium phenylphosphonate carrier, which is specifically produced by:

accurately weighing 5 g of titanium phenylphosphonate $(Ti(C_6H_5PO_3)_2)$, adding thereto 100 g of deionized water, and treating this mixture system with a shear emulsifier at a rotor speed of 8,000 rpm for 30 min, to give a white milky titanium phenylphosphonate suspension;

molding the titanium phenylphosphonate suspension by a spray dryer having an inlet temperature of 180° C. and an outlet temperature of 120° C.;

heating the obtained solid powder to 100° C. and vacuum drying for 4 h, and then naturally cooling to room temperature under nitrogen protection, to give a spherical titanium phenylphosphonate carrier product, designated as sTiBP.

Example 4

This example provides a spherical titanium phenylphosphonate hydrophosphate carrier, which is specifically produced by:

accurately weighing 10 g of titanium phenylphosphonate $(Ti(C_6H_5PO_3)(HPO_4))$, adding thereto 100 g of deionized water, and treating this mixture system with a shear emulsifier at a rotor speed of 8,000 rpm for 60 min, to give a white milky titanium phenylphosphonate suspension;

molding the titanium phenylphosphonate suspension by a spray dryer having an inlet temperature of 180° C. and an outlet temperature of 120° C.;

heating the obtained solid powder to 150° C. and vacuum drying for 4 h, and then naturally cooling to room temperature under nitrogen protection, to give a spherical titanium phenylphosphonate hydrophosphate carrier product, designated as sTiBPHP.

Example 5

This example provides a spherical sulfuric acid acidified titanium hydrophosphate carrier, which is specifically produced by:

accurately weighing 15 g of titanium hydrophosphate $(Ti(HPO_4)_2)$, adding thereto 150 ml 30% sulfuric acid aqueous solution was added, stirring to disperse uniformly, and heating to 95° C., continuing to react for 24 h; after completion of the reaction, lowering to room temperature, and washing the filtered product with deionized water; adding 100 g of deionized water to the product (sulfuric acid acidified titanium hydrophosphate); treating this mixture system with a shear emulsifier at a rotor speed of 10,000 rpm for 30 min, to give a white milky sulfuric acid acidified titanium hydrophosphate suspension;

molding the sulfuric acid acidified titanium hydrophosphate suspension by a spray dryer having an inlet temperature of 200° C. and an outlet temperature of 120° C.;

heating the obtained solid powder to 200° C. and vacuum drying for 4 h, and then naturally cooling to room temperature under nitrogen protection, to give a spherical sulfuric acid acidified titanium hydrophosphate carrier product, designated as sTiP-S.

Example 6

This example provides a spherical zirconium hydrophosphate carrier, which is specifically produced by:

accurately weighing 20 g of zirconium hydrophosphate $(Zr(HPO_4)_2)$, adding thereto 90 g of deionized water, and treating this mixture system with a shear emulsifier at a rotor speed of 8,000 rpm for 30 min, to give a white milky zirconium hydrophosphate suspension;

molding the zirconium hydrophosphate suspension by a spray dryer having an inlet temperature of 180° C. and an outlet temperature of 120° C.;

heating the obtained solid powder to 150° C. and vacuum drying for 6 h, and then naturally cooling to room temperature under nitrogen protection to give a spherical zirconium hydrophosphate carrier product, designated as sZrP.

Example 7

This example provides a spherical supported metallocene catalyst produced from the carrier of Example 1 supporting zirconocene dichloride $(Cp_2ZrCl_2)$, which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 10 ml of methylaluminoxane (1.5 M toluene solution) and stirring at 20° C. for 20 min, to give an activated carrier;

accurately weighing 100 mg of $Cp_2ZrCl_2$ under nitrogen protection into a glass reactor sufficiently substituted with nitrogen, and adding thereto 15 ml of dewatered refined toluene; after stirring to dissolve it completely, adding thereto 1 ml of methylaluminoxane (1.5 M toluene solution) and stirring at 20° C. for 20 min, to give an activated $Cp_2ZrCl_2$ solution;

adding the activated $Cp_2ZrCl_2$ solution to the activated carrier under nitrogen protection and stirring at 20° C. for 30 min; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-$Cp_2ZrCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-$Cp_2ZrCl_2$, ethylene was introduced, the pressure was raised and maintained at 1.0 MPa, and the reaction was allowed to proceed at 60° C. for 1 h; the activity of the catalyst was measured to be 330 gPE/gcat·h.

Example 8

This example provides a spherical supported metallocene catalyst produced from the carrier of Example 2 supporting zirconocene dichloride ($Cp_2ZrCl_2$), which is specifically prepared by:

accurately weighing 5 g of sTiP-2 under nitrogen protection into a glass reactor sufficiently substituted with nitrogen, and adding thereto 25 ml of dewatered refined toluene; after stirring to disperse it uniformly, adding thereto 30 ml of methylaluminoxane (1.5 M toluene solution) and stirring at 50° C. for 2 h to give an activated carrier;

accurately weighing 150 mg of $Cp_2ZrCl_2$ under nitrogen protection into a glass reactor sufficiently substituted with nitrogen, and adding thereto 15 ml of dewatered refined toluene; after stirring to dissolve it completely, adding thereto 3 ml of methylaluminoxane (1.5 M toluene solution) and stirring at 50° C. for 2 h to give an activated $Cp_2ZrCl_2$ solution;

adding the activated $Cp_2ZrCl_2$ solution to the activated carrier under nitrogen protection and stirring at 50° C. for 3 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-2-$Cp_2ZrCl_2$).

Into a 2 L stainless steel autoclave for polymerizaiton sufficiently substituted with ethylene, 1 L of dewatered refined hexane was added, 2 ml of triethylaluminum (2.4 M in hexane) was added, followed by the addition of 100 mg of the catalyst sTiP-2-$Cp_2ZrCl_2$, ethylene was introduced, the pressure was raised and maintained at 1.0 MPa, and the reaction was allowed to proceed at 60° C. for 1 h; the activity of the catalyst was measured to be 400 gPE/gcat·h.

Example 9

This example provides a spherical supported metallocene catalyst produced from the carrier of Example 3 supporting zirconocene dichloride ($Cp_2ZrCl_2$), which is specifically prepared by:

accurately weighing 5 g of sTiBP under nitrogen protection into a glass reactor sufficiently substituted with nitrogen, and adding thereto 25 ml of dewatered refined toluene; after stirring to disperse it uniformly, adding thereto 25 ml of methylaluminoxane (1.5 M toluene solution) and stirring at 30° C. for 1 h to give an activated carrier;

accurately weighing 100 mg of $Cp_2ZrCl_2$ under nitrogen protection into a glass reactor sufficiently substituted with nitrogen, and adding thereto 15 ml of dewatered refined toluene; after stirring to dissolve it completely, adding thereto 20 ml of methylaluminoxane (1.5 M toluene solution) and stirring at 30° C. for 1 h to give an activated $Cp_2ZrCl_2$ solution;

adding the activated $Cp_2ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiBP-$Cp_2ZrCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiBP-$Cp_2ZrCl_2$, ethylene was introduced, the pressure was raised and maintained at 1.0 MPa, and the reaction was allowed to proceed at 60° C. for 1 h; the activity of the catalyst was measured to be 120 gPE/gcat·h.

Example 10

This example provides a spherical supported metallocene catalyst produced from the carrier of Example 4 supporting zirconocene dichloride ($Cp_2ZrCl_2$), which is specifically prepared by:

accurately weighing 5 g of sTiBPHP under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 30° C. for 1 h to give an activated carrier;

accurately weighing 100 mg of $Cp_2ZrCl_2$ under nitrogen protection into a glass reactor sufficiently substituted with nitrogen, and adding thereto 15 ml of dewatered refined toluene; after stirring to dissolve it completely, adding thereto 2 ml of methylaluminoxane (1.5 M toluene solution) and stirring at 30° C. for 1 h to give an activated $Cp_2ZrCl_2$ solution;

adding the activated $Cp_2ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiBPHP-$Cp_2ZrCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiBPHP-$Cp_2ZrCl_2$, ethylene was introduced, the pressure was raised and maintained at 1.0 MPa, and the reaction was allowed to proceed at 60° C. for 1 h; the activity of the catalyst was measured to be 220 gPE/gcat·h.

Example 11

This example provides a spherical supported metallocene catalyst, which is prepared from the carrier in Example 5 loaded with zirconocene dichloride ($Cp_2ZrCl_2$), which is specifically prepared by:

accurately weighing 5 g of sTiP-S under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 30° C. for 1 h to give an activated carrier;

accurately weighing 50 mg of $Cp_2ZrCl_2$ under nitrogen protection into a glass reactor sufficiently substituted with nitrogen, and adding thereto 15 ml of dewatered refined toluene; after stirring to dissolve it completely, adding thereto 1 ml of methylaluminoxane (1.5 M toluene solution) and stirring at 30° C. for 1 h to give an activated $Cp_2ZrCl_2$ solution;

adding the activated $Cp_2ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-S-$Cp_2ZrCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-S-$Cp_2ZrCl_2$, ethylene was introduced, the pressure was raised and maintained at 1.0 MPa, and the reaction was allowed to proceed at 60° C. for 1 h; the activity of the catalyst was measured to be 500 gPE/gcat·h.

Example 12

This example provides a spherical supported metallocene catalyst produced from the carrier of Example 1 supporting bisindenylzirconium dichloride ($Ind_2ZrCl_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 30° C. for 1 h to give an activated carrier;

accurately weighing 60 mg of $Ind_2ZrCl_2$ under nitrogen protection into a glass reactor sufficiently substituted with nitrogen, and adding thereto 15 ml of dewatered refined toluene; after stirring to dissolve it completely, adding thereto 1 ml of methylaluminoxane (1.5 M toluene solution) and stirring at 30° C. for 1 h to give an activated $Ind_2ZrCl_2$ solution;

adding the activated $Ind_2ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-$Ind_2ZrCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-$Ind_2ZrCl_2$, ethylene was introduced, the pressure was raised and maintained at 1.0 MPa, and the reaction was allowed to proceed at 60° C. for 1 h; the activity of the catalyst was measured to be 530 gPE/gcat·h.

Example 13

Figure 2:
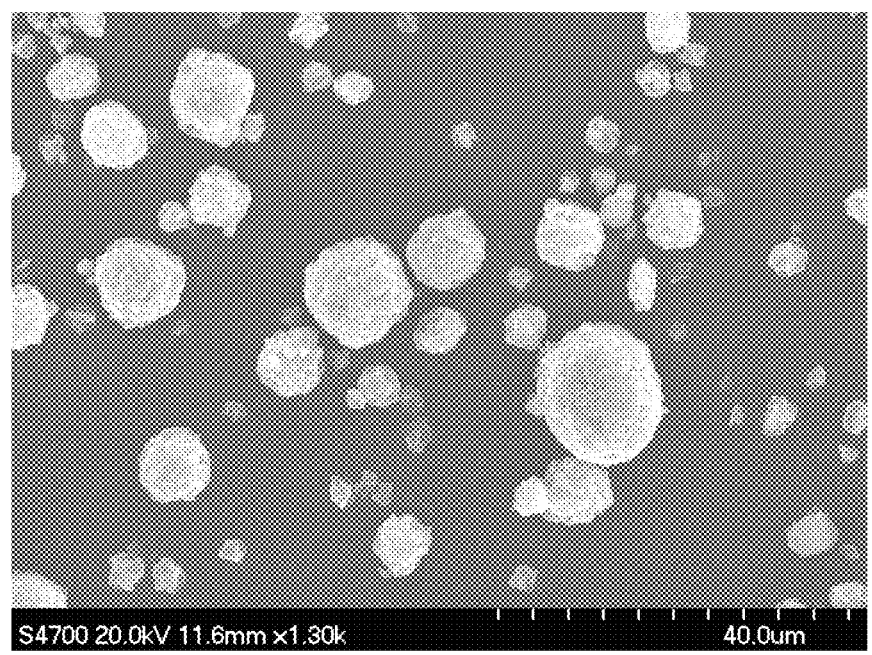
FIG. 2 is a scanning electron micrograph of the spherical supported metallocene catalyst produced in Example 13.

This example provides a spherical supported metallocene catalyst produced from the carrier of Example 1 supporting bis(n-butylcyclopentadienyl)zirconium dichloride (($nBuCp)_2ZrCl_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 70 mg of ($nBuCp)_2ZrCl_2$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated ($nBuCp)_2ZrCl_2$ solution;

adding the activated ($nBuCp)_2ZrCl_2$ solution the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-($nBuCp)_2ZrCl_2$, of which the scanning electron micrograph is shown in FIG. 2).

Figure 3:
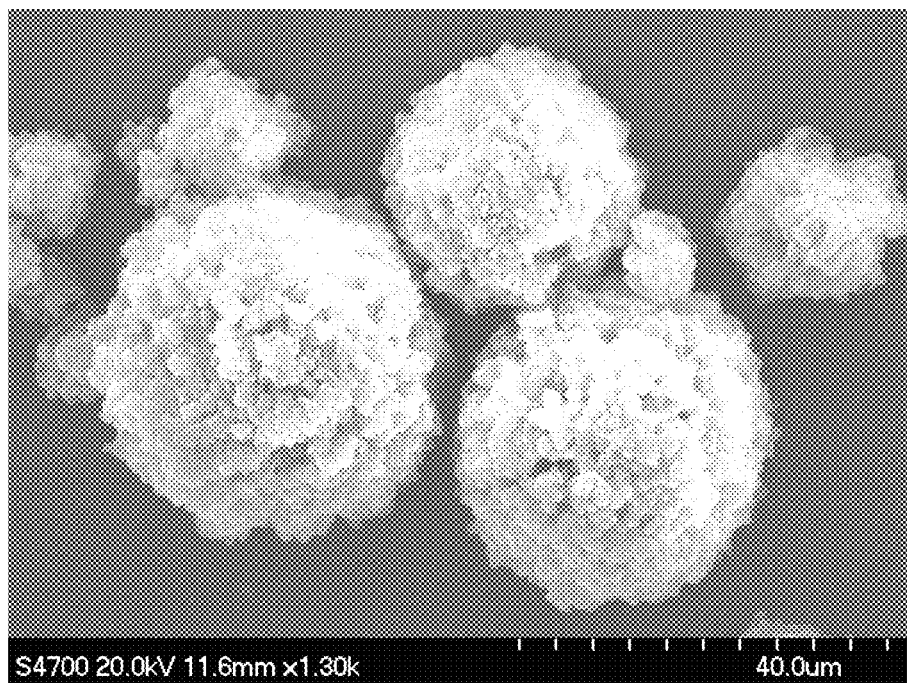
FIG. 3 is a scanning electron micrograph of polyethylene obtained in Example 13.

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-($nBuCp)_2ZrCl_2$, ethylene was introduced, the pressure was raised and maintained at 1.0 MPa, and the reaction was allowed to proceed at 60° C. for 1 h (the scanning electron micrograph of the obtained polyethylene product is shown in FIG. 3); the activity of the catalyst was measured to be 2300 gPE/gcat·h.

Example 14

This example provides a spherical supported metallocene catalyst produced from the carrier of Example 1 supporting fluorenylcyclopentadienylzirconium dichloride (FluCpZrCl$_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of FluCpZrCl$_2$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated FluCpZrCl$_2$ solution;

adding the activated FluCpZrCl$_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-FluCpZrCl$_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-FluCpZrCl$_2$, ethylene was introduced, the pressure was raised and maintained at 1.0 MPa, and the reaction was allowed to proceed at 60° C. for 1 h; the activity of the catalyst was measured to be 600 gPE/gcat·h.

Example 15

This example provides a spherical supported metallocene catalyst produced from the carrier of Example 1 supporting bis(tert-butylcyclopentadienyl)hafnium dichloride (($tBuCp)_2HfCl_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of ($tBuCp)_2HfCl_2$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated ($tBuCp)_2HfCl_2$ solution;

adding the activated ($tBuCp)_2HfCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-($tBuCp)_2HfCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-($tBuCp)_2HfCl_2$, ethylene was introduced, the pressure was raised and maintained at 1.0 MPa, and the reaction was allowed to proceed at 60° C. for 1 h; the activity of the catalyst was measured to be 2100 gPE/gcat·h.

Example 16

This example provides a spherical supported metallocene catalyst produced from the carrier of Example 1 supporting bis(tert-butylcyclopentadienyl)dimethylhafnium (($BuCp)_2Hf(CH_3)_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 1 h to give an activated carrier;

accurately weighing 100 mg of ($BuCp)_2Hf(CH_3)_2$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated ($BuCp)_2Hf(CH_3)_2$ solution;

adding the activated ($BuCp)_2Hf(CH_3)_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-($BuCp)_2Hf(CH_3)_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-($BuCp)_2Hf(CH_3)_2$, ethylene was introduced, the pressure was raised and maintained at 1.0 MPa, and the reaction was allowed to proceed at 60° C. for 1 h; the activity of the catalyst was measured to be 1810 gPE/gcat·h.

Example 17

This example provides a spherical supported metallocene catalyst produced from the carrier of Example 6 supporting cyclopentadienyltitanium trichloride ($CpTiCl_3$), which is specifically prepared by:

accurately weighing 5 g of sZrP under nitrogen protection into a glass reactor sufficiently substituted with nitrogen, and adding thereto 25 ml of dewatered refined toluene; after stirring to disperse it uniformly, adding thereto 20 ml of methylaluminoxane (1.5 M toluene solution) and stirring at 40° C. for 1 h to give an activated carrier;

accurately weighing 50 mg of $CpTiCl_3$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated $CpTiCl_3$ solution;

adding the activated $CpTiCl_3$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sZrP-$CpTiCl_3$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sZrP-$CpTiCl_3$, ethylene was introduced, the pressure was raised and maintained at 1.0 MPa, and the reaction was allowed to proceed at 60° C. for 1 h; the activity of the catalyst was measured to be 80 gPE/gcat·h.

Example 18

This example provides a spherical supported metallocene catalyst produced from the carrier of Example 6 supporting indenyltitanium trichloride ($IndTiCl_3$), which is specifically prepared by:

accurately weighing 5 g of sZrP under nitrogen protection into a glass reactor sufficiently substituted with nitrogen, and adding thereto 25 ml of dewatered refined toluene; after stirring to disperse it uniformly, adding thereto 20 ml of methylaluminoxane (1.5 M toluene solution) and stirring at 40° C. for 1 h to give an activated carrier;

accurately weighing 50 mg of $IndTiCl_3$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated $IndTiCl_3$ solution;

adding the activated IndTiCl$_3$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sZrP-IndTiCl$_3$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sZrP-IndTiCl$_3$, ethylene was introduced, the pressure was raised and maintained at 1.0 MPa, and the reaction was allowed to proceed at 60° C. for 1 h; the activity of the catalyst was measured to be 100 gPE/gcat·h.

Example 19

This example provides a spherical supported metallocene catalyst produced from the carrier of Example 6 supporting pentamethycyclopentadienyltitanium trichloride (Cp*TiCl$_3$), which is specifically prepared by:

accurately weighing 5 g of sZrP under nitrogen protection into a glass reactor sufficiently substituted with nitrogen, and adding thereto 25 ml of dewatered refined toluene; after stirring to disperse it uniformly, adding thereto 20 ml of methylaluminoxane (1.5 M toluene solution) and stirring at 40° C. for 1 h to give an activated carrier;

accurately weighing 50 mg of Cp*TiCl$_3$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated Cp*TiCl$_3$ solution;

adding the activated Cp*TiCl$_3$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sZrP-Cp*TiCl$_3$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sZrP-Cp*TiCl$_3$, ethylene was introduced, the pressure was raised and maintained at 1.0 MPa, and the reaction was allowed to proceed at 60° C. for 1 h; the activity of the catalyst was measured to be 110 gPE/gcat·h.

Example 20

This example provides a spherical supported metallocene catalyst produced from the carrier of Example 6 supporting pentamethycyclopentadienylzirconium trichloride (Cp*ZrCl$_3$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 20 ml of methylaluminoxane (1.5 M toluene solution) and stirring at 40° C. for 1 h to give an activated carrier;

accurately weighing 50 mg of Cp*ZrCl$_3$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated Cp*ZrCl$_3$ solution;

adding the activated Cp*ZrCl$_3$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-Cp*ZrCl$_3$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Cp*ZrCl$_3$, ethylene was introduced, the pressure was raised and maintained at 1.0 MPa, and the reaction was allowed to proceed at 60° C. for 1 h; the activity of the catalyst was measured to be 100 gPE/gcat·h.

Example 21

This example provides a spherical supported metallocene catalyst produced from the carrier of Example 6 supporting dimethyl(bis(cyclopentadienyl)silyl)zirconium dichloride (Me$_2$SiCp$_2$ZrCl$_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 50 mg of Me$_2$SiCp$_2$ZrCl$_2$ under nitrogen protection into a glass reactor sufficiently substituted with nitrogen, and adding thereto 10 ml of dewatered refined toluene; after stirring to dissolve it completely, adding thereto 1 ml of methylaluminoxane (1.5 M toluene solution) and stirring at 40° C. for 1 h to give an activated Me$_2$SiCp$_2$ZrCl$_2$ solution;

adding the activated Me$_2$SiCp$_2$ZrCl$_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-Me$_2$SiCp$_2$ZrCl$_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Me$_2$SiCp$_2$ZrCl$_2$, ethylene was introduced, the pressure was raised and maintained at 1.0 MPa, and the reaction was allowed to proceed at 60° C. for 1 h; the activity of the catalyst was measured to be 450 gPE/gcat·h.

Example 22

This example provides a spherical supported metallocene catalyst produced from the carrier of Example 1 supporting dimethyl(bis(9-fluorenyl)silyl)zirconium dichloride (Me$_2$Si(9-Flu)$_2$ZrCl$_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of $Me_2Si(9-Flu)_2ZrCl_2$ under nitrogen protection into a glass reactor sufficiently substituted with nitrogen, and adding thereto 10 ml of dewatered refined toluene; after stirring to dissolve it completely, adding thereto 5 ml of methylaluminoxane (1.5 M toluene solution) and stirring at 40° C. for 1 h to give an activated $Me_2Si(9-Flu)_2ZrCl_2$ solution;

adding the activated $Me_2Si(9-Flu)_2ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-$Me_2Si(9-Flu)_2ZrCl_2$).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-$Me_2Si(9-Flu)_2ZrCl_2$, ethylene was introduced, the pressure was raised and maintained at 1.0 MPa, and the reaction was allowed to proceed at 60° C. for 1 h; the activity of the catalyst was measured to be 340 gPE/gcat·h.

Example 23

This example provides a spherical supported metallocene catalyst produced from the carrier of Example 1 supporting isopropylidenebis(9-fluorenyl)zirconium dichloride (iPr(9-$Flu)_2ZrCl_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of iPr(9-$Flu)_2ZrCl_2$ under nitrogen protection into a glass reactor sufficiently substituted with nitrogen, and adding thereto 10 ml of dewatered refined toluene; after stirring to dissolve it completely, adding thereto 5 ml of methylaluminoxane (1.5 M toluene solution) and stirring at 40° C. for 1 h to give an activated iPr(9-$Flu)_2ZrCl_2$ solution;

adding the activated iPr(9-$Flu)_2ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-iPr(9-$Flu)_2ZrCl_2$).

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-iPr(9-$Flu)_2ZrCl_2$, the temperature was raised to 60° C. and the reaction was allowed to proceed for 2 h; the activity of the catalyst was measured to be 210 gPP/gcat·h.

Example 24

This example provides a spherical supported metallocene catalyst produced from the carrier of Example 1 supporting isopropylidene(cyclopentadienyl)(9-fluorenyl)zirconium dichloride (iPrCp(9-Flu)$ZrCl_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of iPrCp(9-Flu)$ZrCl_2$ under nitrogen protection into a glass reactor sufficiently substituted with nitrogen, and adding thereto 10 ml of dewatered refined toluene; after stirring to dissolve it completely, adding thereto 5 ml of methylaluminoxane (1.5 M toluene solution) and stirring at 40° C. for 1 h to give an activated iPrCp(9-Flu)$ZrCl_2$ solution;

adding the activated iPrCp(9-Flu)$ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-iPrCp(9-Flu)$ZrCl_2$).

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-iPrCp(9-Flu)$ZrCl_2$, the temperature was raised to 60° C. and the reaction was allowed to proceed for 2 h; the activity of the catalyst was measured to be 200 gPP/gcat·h.

Example 25

This example provides a spherical supported metallocene catalyst produced from the carrier of Example 1 supporting diphenylmethylidene(cyclopentadienyl)(9-fluorenyl)zirconium dichloride ($Ph_2CCp(9-Flu)ZrCl_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of $Ph_2CCp(9-Flu)ZrCl_2$ under nitrogen protection into a glass reactor sufficiently substituted with nitrogen, and adding thereto 10 ml of dewatered refined toluene; after stirring to dissolve it completely, adding thereto 5 ml of methylaluminoxane (1.5 M toluene solution) and stirring at 40° C. for 1 h to give an activated $Ph_2CCp(9-Flu)ZrCl_2$ solution;

adding the activated $Ph_2CCp(9-Flu)ZrCl_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-$Ph_2CCp(9-Flu)ZrCl_2$).

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-$Ph_2CCp(9-Flu)ZrCl_2$, the temperature was raised to 60° C. and the reaction was allowed to proceed for 2 h; the activity of the catalyst was measured to be 250 gPP/gcat·h.

Example 26

This example provides a spherical supported metallocene catalyst produced from the carrier of Example 1 supporting rac-ethylenebisindenylzirconium dichloride (rac-EtInd$_2$ZrCl$_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 60 mg of rac-EtInd$_2$ZrCl$_2$ under nitrogen protection into a glass reactor sufficiently substituted with nitrogen, and adding thereto 10 ml of dewatered refined toluene; after stirring to dissolve it completely, adding thereto 10 ml of methylaluminoxane (1.5 M toluene solution) and stirring at 40° C. for 1 h to give an activated rac-EtInd$_2$ZrCl$_2$ solution;

adding the activated rac-EtInd$_2$ZrCl$_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-rac-EtInd$_2$ZrCl$_2$).

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-rac-EtInd$_2$ZrCl$_2$, the temperature was raised to 60° C. and the reaction was allowed to proceed for 2 h; the activity of the catalyst was measured to be 1500 gPP/gcat·h.

Example 27

This example provides a spherical supported metallocene catalyst produced from the carrier of Example 1 supporting rac-ethylenebis(tetrahydroindenyl)zirconium dichloride (rac-Et(IndH$_4$)$_2$ZrCl$_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of rac-Et(IndH$_4$)$_2$ZrCl$_2$ under nitrogen protection into a glass reactor sufficiently substituted with nitrogen, and adding thereto 10 ml of dewatered refined toluene; after stirring to dissolve it completely, adding thereto 15 ml of methylaluminoxane (1.5 M toluene solution) and stirring at 40° C. for 1 h to give an activated rac-Et(IndH$_4$)$_2$ZrCl$_2$ solution;

adding the activated rac-Et(IndH$_4$)$_2$ZrCl$_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-rac-Et(IndH$_4$)$_2$ZrCl$_2$).

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-rac-Et(IndH$_4$)$_2$ZrCl$_2$, the temperature was raised to 60° C. and the reaction was allowed to proceed for 2 h; the activity of the catalyst was measured to be 1830 gPP/gcat·h.

Example 28

This example provides a spherical supported metallocene catalyst produced from the carrier of Example 1 supporting rac-dimethyl(bis(2-methyl-4,5-benzoindenyl)silyl)zirconium dichloride (rac-Me$_2$Si(2-Me-4,5-BenzInd)$_2$ZrCl$_2$), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 1 h to give an activated carrier;

accurately weighing 100 mg of rac-Me$_2$Si(2-Me-4,5-BenzInd)$_2$ZrCl$_2$ under nitrogen protection into a glass reactor sufficiently substituted with nitrogen, and adding thereto 20 ml of dewatered refined toluene; after stirring to dissolve it completely, adding thereto 10 ml of methylaluminoxane (1.5 M toluene solution) and stirring at 40° C. for 1 h to give an activated rac-Me$_2$Si(2-Me-4,5-BenzInd)$_2$ZrCl$_2$ solution;

adding the activated rac-Me$_2$Si(2-Me-4,5-BenzInd)$_2$ZrCl$_2$ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-rac-Me$_2$Si(2-Me-4,5-BenzInd)$_2$ZrCl$_2$).

Figure 4:
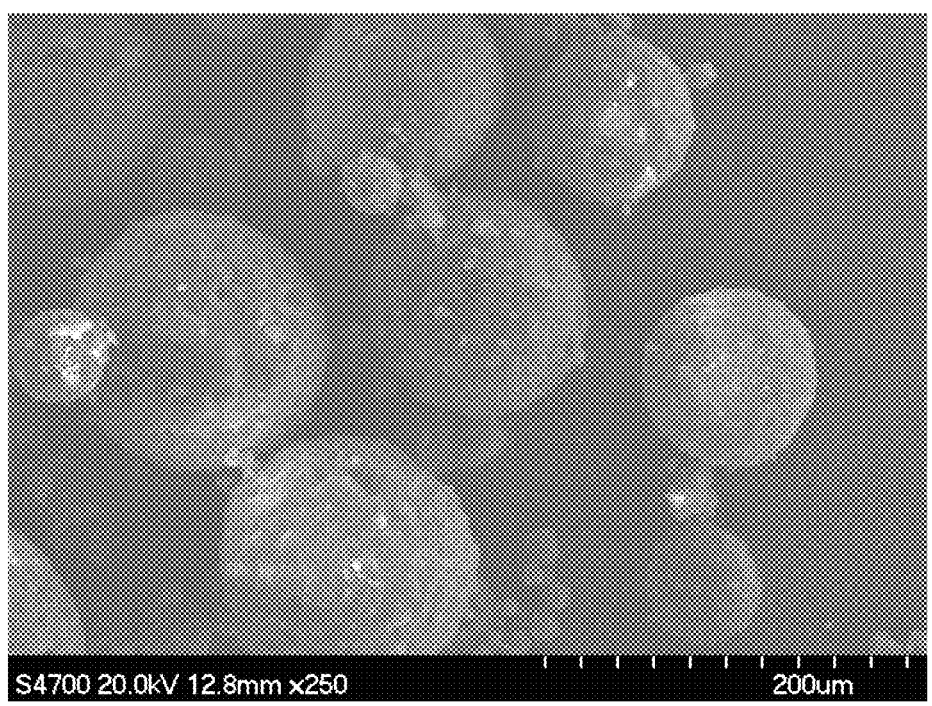
FIG. 4 is a scanning electron micrograph of polypropylene obtained in Example 28.

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-rac-Me$_2$Si(2-Me-4,5-BenzInd)$_2$ZrCl$_2$, the temperature was raised to 60° C. and the reaction was allowed to proceed for 2 h (the scanning electron micrograph of the obtained polypropylene product is shown in FIG. 4); the activity of the catalyst was measured to be 2130 gPP/gcat·h.

Figure 5:
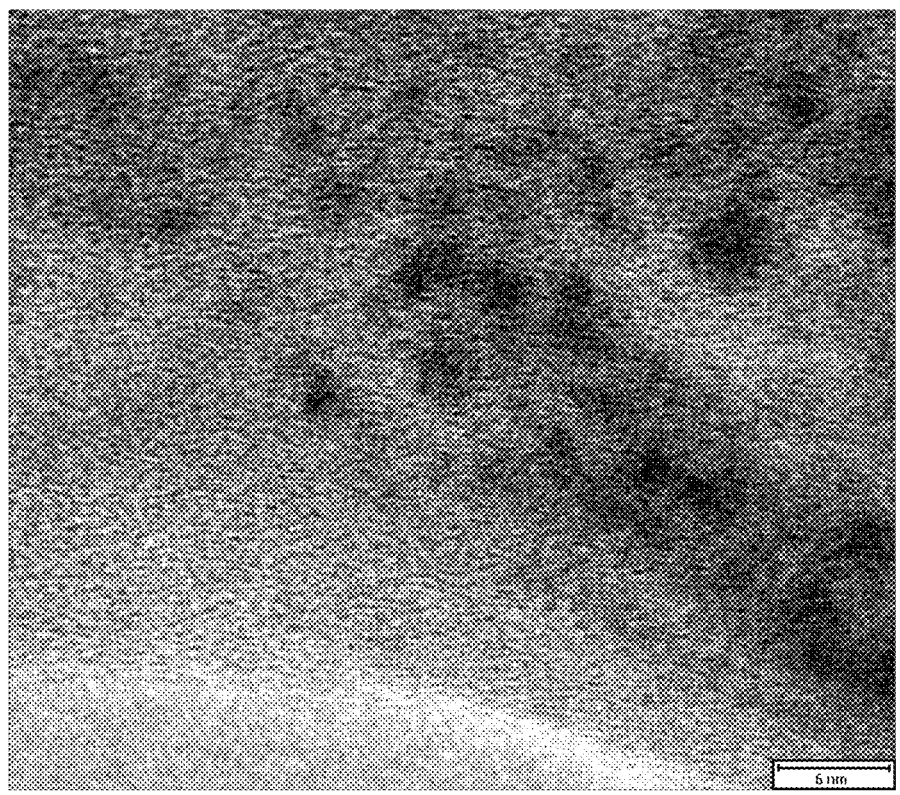
FIG. 5 is a transmission electron micrograph of polypropylene obtained in Example 28.

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-rac-Me$_2$Si(2-Me-4,5-BenzInd)$_2$ZrCl$_2$, the temperature was raised to 60° C. and the reaction was allowed to proceed for 30 min, to give 50 g of polypropylene. FIG. 5 is a transmission electron micrograph of polypropylene (polymerization reaction was only allowed to proceed at 60° C. for 30 min, so that the content of the carrier in the polymer is relatively high, and it is easy to observe the distribution of the carrier in the polymer). In this figure, the scale is 6 nm, and the black part is the carrier. From this figure, it is known that the carrier is uniformly dispersed in the polymer in a nano-scale.

Example 29

This example provides a spherical supported metallocene catalyst produced from the carrier of Example 1 supporting rac-dimethyl(bis(2-methyl-4-phenylindenyl)silyl)zirconium dichloride (rac-Me₂Si(2-Me-4-PhInd)₂ZrCl₂), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 1 h to give an activated carrier;

accurately weighing 100 mg of rac-Me₂Si(2-Me-4-PhInd)₂ZrCl₂ under nitrogen protection into a glass reactor sufficiently substituted with nitrogen, and adding thereto 50 ml of dewatered refined toluene; after stirring to dissolve it completely, adding thereto 10 ml of methylaluminoxane (1.5 M toluene solution) and stirring at 40° C. for 1 h to give an activated rac-Me₂Si(2-Me-4-PhInd)₂ZrCl₂ solution;

adding the activated rac-Me₂Si(2-Me-4-PhInd)₂ZrCl₂ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sTiP-1-rac-Me₂Si(2-Me-4-PhInd)₂ZrCl₂).

Into a 5 L stainless steel autoclave for polymerization sufficiently substituted with nitrogen, 1 kg of liquid propylene was added, 1 ml of triethylaluminum (2.4 M in hexane) was added, followed by the addition of 100 mg of the catalyst sTiP-1-rac-Me₂Si(2-Me-4-PhInd)₂ZrCl₂, the temperature was raised to 60° C. and the reaction was allowed to proceed for 2 h; the activity of the catalyst was measured to be 2400 gPP/gcat·h.

Example 30

This example provides a spherical supported metallocene catalyst produced from the carrier of Example 1 supporting [Me₂Si(Me₄Cp)(NtBu)]TiCl₂

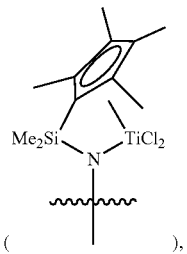

which is specifically prepared by:

accurately weighing 5 g of sZrP under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 100 mg of [Me₂Si(Me₄Cp)(NtBu)]TiCl₂ under nitrogen protection into a glass reactor sufficiently substituted with nitrogen, and adding thereto 50 ml of dewatered refined toluene; after stirring to dissolve it completely, adding thereto 2 ml of methylaluminoxane (1.5 M toluene solution) and stirring at 40° C. for 1 h to give an activated [Me₂Si(Me₄Cp)(NtBu)]TiCl₂ solution;

adding the activated [Me₂Si(Me₄Cp)(NtBu)]TiCl₂ solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported metallocene catalyst (designated as sZrP-[Me₂Si(Me₄Cp)(NtBu)]TiCl₂).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sZrP-[Me₂Si(Me₄Cp)(NtBu)]TiCl₂, ethylene was introduced, the pressure was raised and maintained at 1.0 MPa, and the reaction was allowed to proceed at 60° C. for 1 h; the activity of the catalyst was measured to be 2300 gPE/gcat·h.

Example 31

This example provides a spherical supported non-metallocene transition metal catalyst produced from the carrier of Example 1 supporting

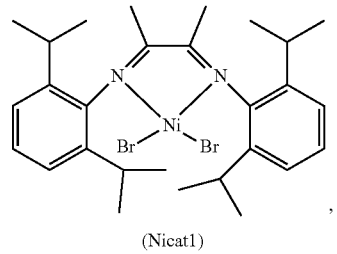

(Nicat1)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 1 h to give an activated carrier;

accurately weighing 120 mg of Nicat1 under nitrogen protection into a glass reactor sufficiently substituted with nitrogen, and adding thereto 50 ml of dewatered refined toluene; after stirring to dissolve it completely, adding thereto 2 ml of methylaluminoxane (1.5 M toluene solution) and stirring at 40° C. for 1 h to give an activated Nicat1 solution;

adding the activated Nicat1 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Nicat1).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Nicat1, ethylene was introduced, the pressure was raised and maintained at 1.0 MPa, and the reaction was allowed to proceed at 60° C. for 1 h; the activity of the catalyst was measured to be 620 gPE/gcat·h.

Example 32

This example provides a spherical supported non-metallocene transition metal catalyst produced from the carrier of Example 1 supporting

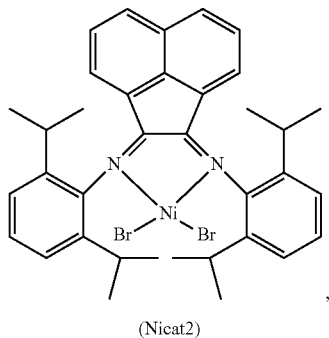

(Nicat2)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 1 h to give an activated carrier;

accurately weighing 100 mg of Nicat2 under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Nicat2 solution;

adding the activated Nicat2 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Nicat2).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Nicat2, ethylene was introduced, the pressure was raised and maintained at 1.0 MPa, and the reaction was allowed to proceed at 60° C. for 1 h; the activity of the catalyst was measured to be 650 gPE/gcat·h.

Example 33

This example provides a spherical supported non-metallocene transition metal catalyst produced from the carrier of Example 1 supporting

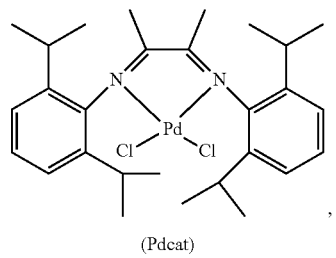

(Pdcat)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 2 h to give an activated carrier;

accurately weighing 100 mg of Pdcat under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Pdcat solution;

adding the activated Pdcat solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Pdcat).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Pdcat, ethylene was introduced, the pressure was raised and maintained at 1.0 MPa, and the reaction was allowed to proceed at 60° C. for 1 h; the activity of the catalyst was measured to be 180 gPE/gcat·h.

Example 34

This example provides a spherical supported non-metallocene transition metal catalyst produced from the carrier of Example 1 supporting 2,6-bis[1-(2,6-dimethyl-4-(3-hydroxypropyl)phenylimino)ethylene]pyridineiron(II) chloride (Fecat1), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 2 h to give an activated carrier;

accurately weighing 100 mg of Fecat1 under nitrogen protection into a glass reactor sufficiently substituted with nitrogen, and adding thereto 50 ml of dewatered refined toluene; after stirring to dissolve it completely, adding thereto 2 ml of methylaluminoxane (1.5 M toluene solution) and stirring at 40° C. for 1 h to give an activated Fecat1 solution;

adding the activated Fecat1 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Fecat1).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Fecat1, ethylene was introduced, the pressure was raised and maintained at 1.0 MPa, and the reaction was allowed to proceed at 60° C. for 1 h; the activity of the catalyst was measured to be 2000 gPE/gcat·h.

Example 35

This example provides a spherical supported non-metallocene transition metal catalyst produced from the carrier of Example 1 supporting [2-(1-(2,4,6-trimethyl-(3-amino)phenyl)imino)ethyl][6-(1-(2,6-diisopropylphenylimino)ethyl]pyridine iron (II) chloride

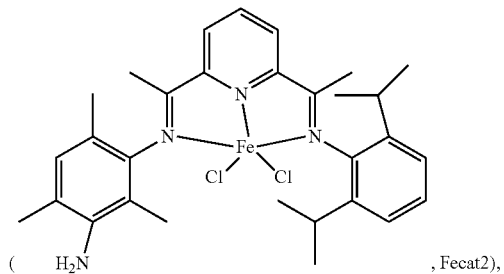

Figure 6:
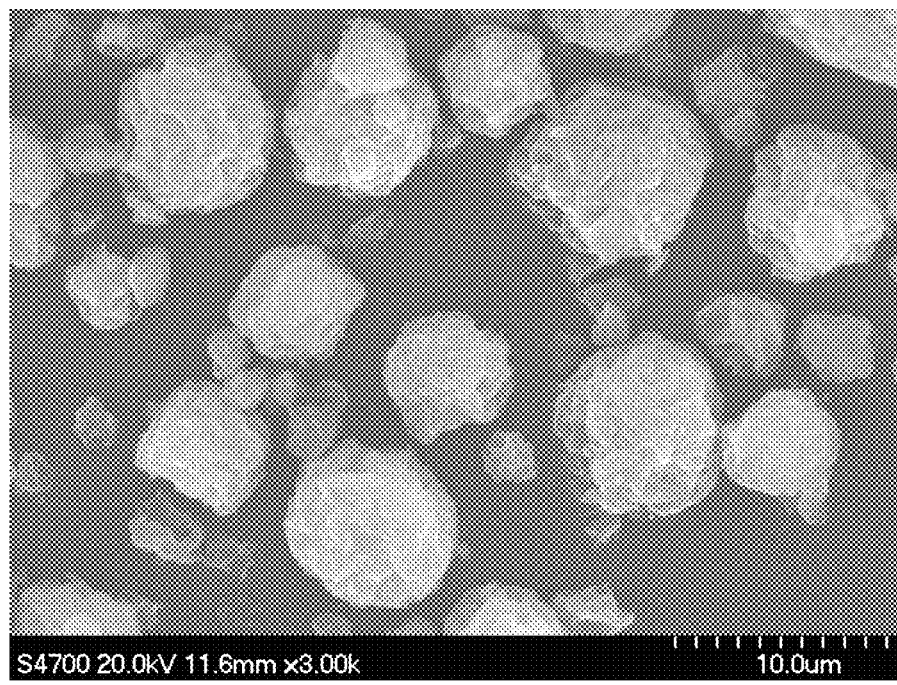
FIG. 6 is a scanning electron micrograph of the spherical supported non-metallocene transition metal catalyst produced in Example 35.

( , Fecat2), which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 15 ml of methylaluminoxane (1.5 M toluene solution) and stirring at 40° C. for 2 h to give an activated carrier;

accurately weighing 100 mg of Fecat2 under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Fecat2 solution;

adding the activated Fecat2 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Fecat2); FIG. 6 is a scanning electron micrograph of sTiP-1-Fecat2.

Figure 7:
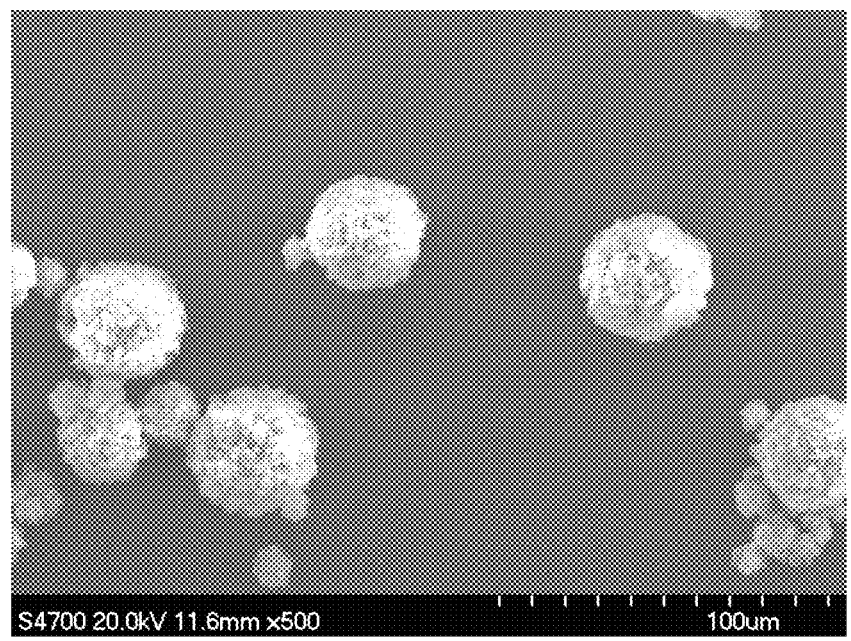
FIG. 7 is a scanning electron micrograph of polyethylene obtained in Example 35.

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Fecat2, ethylene was introduced, the pressure was raised and maintained at 1.0 MPa, and the reaction was allowed to proceed at 60° C. for 1 h; the activity of the catalyst was measured to be 2230 gPE/gcat·h; FIG. 7 is a scanning electron micrograph of the obtained polyethylene.

Figure 8:
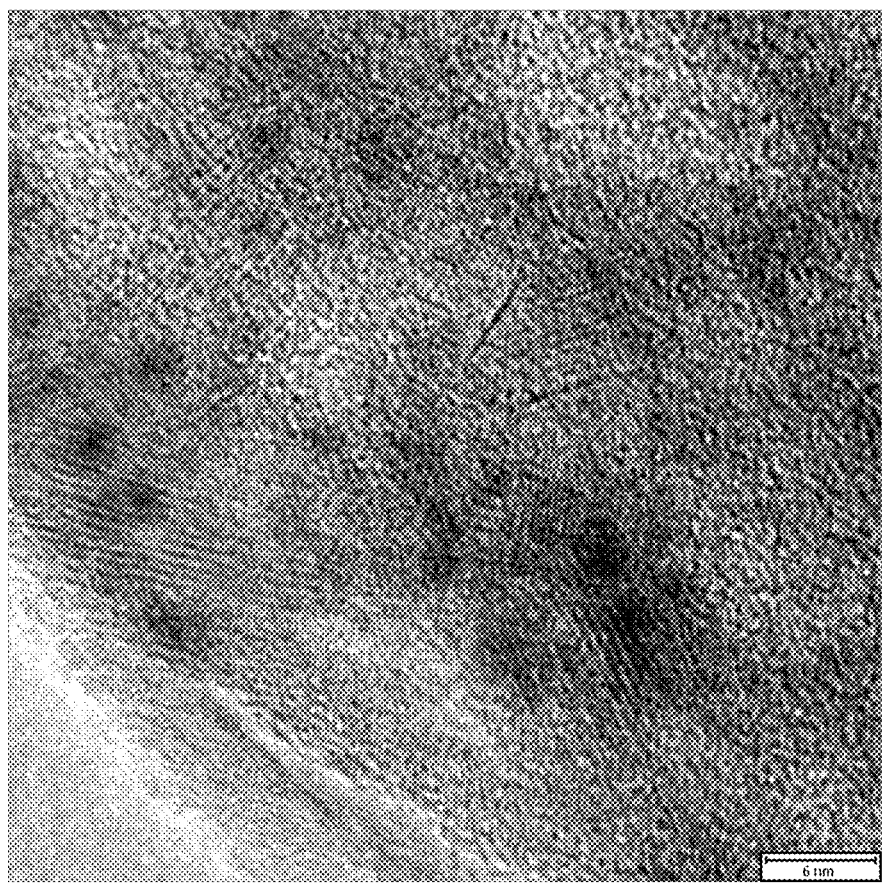
FIG. 8 is a transmission electron micrograph of polyethylene obtained in Example 35.

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Fecat2, ethylene was introduced, the pressure was raised and maintained at 1.0 MPa, and the reaction was allowed to proceed at 60° C. for 10 min, to give 40 g of polyethylene. FIG. 8 is a transmission electron micrograph of the obtained polyethylene (polymerization reaction was only allowed to proceed at 60° C. for 10 min, so that the content of the carrier in the polymer is relatively high, and it is easy to observe the distribution of the carrier in the polymer). In this figure, the scale is 6 nm, and the black part is carrier. From this figure, it is known that the carrier is uniformly dispersed in the polymer in a nano-scale.

Example 36

This example provides a spherical supported non-metallocene transition metal catalyst produced from the carrier of Example 6 supporting

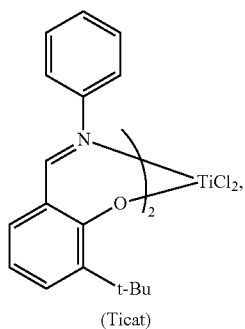

(Ticat)

which is specifically prepared by:

accurately weighing 5 g of sZrP under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 100 mg of Ticat under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Ticat solution;

adding the activated Pdcat solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sZrP-Ticat).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sZrP-Ticat, ethylene was introduced, the pressure was raised and maintained at 1.0 MPa, and the reaction was allowed to proceed at 60° C. for 1 h; the activity of the catalyst was measured to be 1750 gPE/gcat·h.

Example 37

This example provides a spherical supported non-metallocene transition metal catalyst produced from the carrier of Example 1 supporting

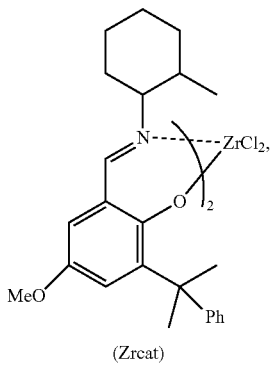

(Zrcat)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 100 mg of Zrcat under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Zrcat solution;

adding the activated Zrcat solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Zrcat).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Zrcat, ethylene was introduced, the pressure was raised and maintained at 1.0 MPa, and the reaction was allowed to proceed at 60° C. for 1 h; the activity of the catalyst was measured to be 2400 gPE/gcat·h.

Example 38

This example provides a spherical supported non-metallocene transition metal catalyst produced from the carrier of Example 1 supporting

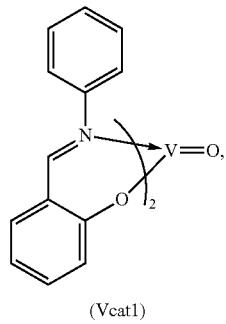

(Vcat1)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 100 mg of Vcat1 under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Vcat1 solution;

adding the activated Vcat1 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Vcat1).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Vcat1, ethylene was introduced, the pressure was raised and maintained at 1.0 MPa, and the reaction was allowed to proceed at 60° C. for 1 h; the activity of the catalyst was measured to be 800 gPE/gcat·h.

Example 39

This example provides a spherical supported non-metallocene transition metal catalyst produced from the carrier of Example 1 supporting

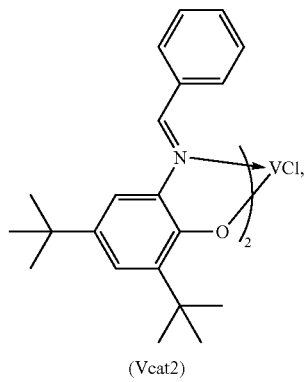

(Vcat2)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 150 mg of Vcat2 under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Vcat2 solution;

adding the activated Vcat2 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Vcat2).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Vcat2, ethylene was introduced, the pressure was raised and maintained at 1.0 MPa, and the reaction was allowed to proceed at 60° C. for 1 h; the activity of the catalyst was measured to be 760 gPE/gcat·h.

Example 40

This example provides a spherical supported non-metallocene transition metal catalyst produced from the carrier of Example 1 supporting

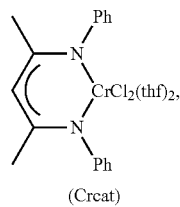

(Crcat)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 150 mg of Crcat under nitrogen protection into a glass reactor sufficiently substituted with nitrogen, and adding thereto 50 ml of dewatered refined toluene; after stirring to dissolve it completely, adding thereto 1 ml of methylaluminoxane (1.5 M toluene solution) and stirring at 40° C. for 1 h to give an activated Crcat solution;

adding the activated Crcat solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-Crcat).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-Crcat, ethylene was introduced, the pressure was raised and maintained at 1.0 MPa, and the reaction was allowed to proceed at 60° C. for 1 h; the activity of the catalyst was measured to be 310 gPE/gcat·h.

Example 41

This example provides a spherical supported non-metallocene transition metal catalyst produced from the carrier of Example 1 supporting

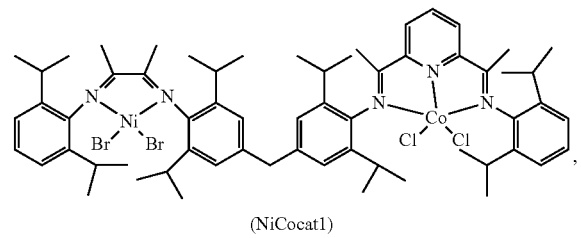

(NiCocat1)

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 100 mg of NiCocat1 under nitrogen protection into a glass reactor sufficiently substituted with nitrogen, and adding thereto 50 ml of dewatered refined toluene; after stirring to dissolve it completely, adding thereto 2 ml of methylaluminoxane (1.5 M toluene solution) and stirring at 40° C. for 1 h to give an activated NiCocat1 solution;

adding the activated NiCocat1 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-NiCocat1).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-NiCocat1, ethylene was introduced, the pressure was raised and maintained at 1.0 MPa, and the reaction was allowed to proceed at 60° C. for 1 h; the activity of the catalyst was measured to be 750 gPE/gcat·h.

Example 42

This example provides a spherical supported non-metallocene transition metal catalyst produced from the carrier of Example 1 supporting

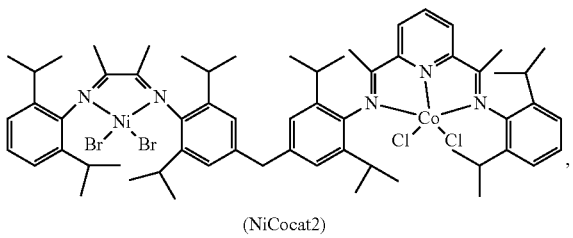

(NiCocat2)

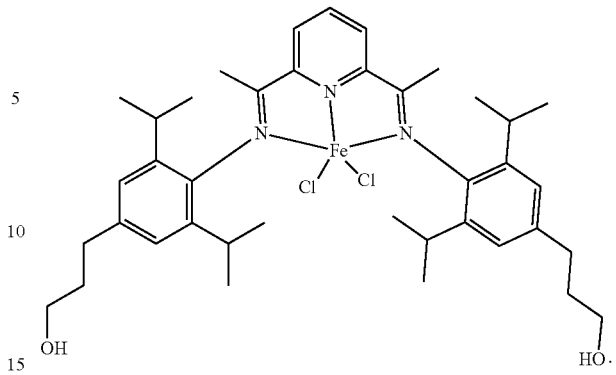

which is specifically prepared by:

accurately weighing 5 g of sTiP-1 under nitrogen protection into a glass reactor sufficiently substituted with nitrogen, and adding thereto 25 ml of dewatered refined toluene; after stirring to disperse it uniformly, adding thereto 16 ml of methylaluminoxane (1.5 M toluene solution) and stirring at 40° C. for 2 h to give an activated carrier;

accurately weighing 100 mg of NiCocat2 under nitrogen protection into a glass reactor sufficiently substituted with nitrogen, and adding thereto 50 ml of dewatered refined toluene; after stirring to dissolve it completely, adding thereto 2 ml of methylaluminoxane (1.5 M toluene solution) and stirring at 40° C. for 1 h to give an activated NiCocat2 solution;

adding the activated NiCocat2 solution to the activated carrier under nitrogen protection and stirring at 40° C. for 2 h; after completion of the reaction, leaving to stand, and filtering off the liquid after layering; washing the mixture twice with 20 ml of dewatered refined toluene, and twice with 30 ml of dewatered refined hexane; vacuum drying the solid to give a spherical supported non-metallocene transition metal catalyst (designated as sTiP-1-NiCocat2).

Into a 2 L stainless steel autoclave for polymerization sufficiently substituted with ethylene, 1 L of dewatered refined hexane was added, 2 ml of triethylaluminum (2.4 M in hexane) was added, followed by the addition of 100 mg of the catalyst sTiP-1-NiCocat2, ethylene was introduced, the pressure was raised and maintained at 1.0 MPa, and the reaction was allowed to proceed at 60° C. for 1 h; the activity of the catalyst was measured to be 970 gPE/gcat·h.

The invention claimed is:

1. A spherical supported transition metal catalyst, wherein a carrier of the catalyst is a spherical titanium hydrophosphate compound or a spherical zirconium hydrophosphate compound, a primary catalyst of the catalyst is a transition metal compound, and a co-catalyst of the catalyst is methylaluminoxane;

wherein the spherical titanium hydrophosphate compound or spherical zirconium hydrophosphate compound comprises one or more of titanium hydrophosphate, modified titanium hydrophosphate and zirconium hydrophosphate; and wherein the content of the central metal of the transition metal compound in the catalyst is 0.1 wt % to 0.4 wt %, and the aluminum content in the catalyst is 5 wt % to 20 wt %;

wherein the transition metal compound comprises one or more of a metallocene compound and a non-metallocene transition metal compound;

wherein the metallocene compound is a metallocene compound having Group IVB transition metal as a central atom and is a silyl bridged metallocene compound; and wherein the non-metallocene transition metal compound is 2. The spherical supported transition metal catalyst according to claim 1, wherein the modified titanium hydrophosphate comprises an organo-modified titanium hydrophosphate or an acid-modified titanium phosphate.

3. The spherical supported transition metal catalyst according to claim 2, wherein the organo-modified titanium hydrophosphate comprises titanium phenylphosphonate and titanium phenylphosphonate hydrophosphate, and the titanium phenylphosphonate hydrophosphate has a chemical formula of $Ti(C_6H_5PO_3)_x(HPO_4)_{2-x}$, $0<x<2$.

4. The spherical supported transition metal catalyst according to claim 3, wherein the chemical formula of the titanium phenylphosphonate hydrophosphate is $Ti(C_6H_5PO_3)_x(HPO_4)_{2-x}$, $0.5 \leq x \leq 1.5$.

5. The spherical supported transition metal catalyst according to claim 2, wherein the acid-modified titanium phosphate comprises sulfuric acid acidified titanium hydrophosphate.

6. The spherical supported transition metal catalyst according to claim 1,
wherein the bridged metallocene compound comprises: dimethyl(bis(cyclopentadienyl)silyl)zirconium dichloride, dimethyl(bis(9-fluorenyl)silyl)zirconium dichloride, rac-dimethyl(bis(2-methyl-4,5-benzoindenyl)silyl)zirconium dichloride or rac-dimethyl(bis(2-methyl-4-phenylindenyl)silyl)zirconium dichloride.

7. A method for preparing the spherical supported transition metal catalyst according to claim 1, comprising:
dispersing the spherical titanium hydrophosphate compound carrier or the spherical zirconium hydrophosphate compound carrier in toluene and adding thereto methylaluminoxane for treatment to give the activated spherical titanium/zirconium hydrophosphate compound carrier;

dissolving the transition metal compound in toluene and adding thereto methylaluminoxane for treatment to give the activated transition metal compound solution; and mixing the activated spherical titanium hydrophosphate compound carrier or the spherical zirconium hydrophosphate compound carrier with the activated transition metal compound solution and stirring to give a mixed mixture, washing and filtering the mixture to obtain a solid precipitate, and drying the solid precipitate to obtain the spherical supported transition metal catalyst.

8. The method for preparing the spherical supported transition metal catalyst according to claim 7, wherein the mass ratio of the transition metal compound to the spherical titanium hydrophosphate compound carrier or the spherical zirconium hydrophosphate compound carrier is (0.01-0.03):1.

9. The method for preparing the spherical supported transition metal catalyst according to claim 7, wherein in preparing the activated spherical titanium hydrophosphate compound carrier or the spherical zirconium hydrophosphate compound carrier, the molar amount of methylaluminoxane is based on the aluminum atom, and the amount ratio of methylaluminoxane to the spherical titanium/zirconium hydrophosphate compound carrier is 3 to 9 mmol/g.

10. The method for preparing the spherical supported transition metal catalyst according to claim 7, wherein in preparing the activated spherical titanium hydrophosphate compound carrier or the spherical zirconium hydrophosphate compound carrier, the molar amount of methylaluminoxane is based on the aluminum atom, and the amount ratio of methylaluminoxane to the spherical titanium hydrophosphate compound carrier or the spherical zirconium hydrophosphate compound carrier is 3 to 9 mmol/g.

11. The method for preparing the spherical supported transition metal catalyst according to claim 7, wherein the methylaluminoxane is added for treatment under the condition of stirring at 1) 20° C. to 50° C. for 20 minutes to 2 hours or 2) 20° C. to 50° C. for 30 minutes to 3 hours.

* * * * *

UNITED STATES PATENT AND TRADEMARK OFFICE
CERTIFICATE OF CORRECTION

PATENT NO. : 10,808,052 B2
APPLICATION NO. : 15/747268
DATED : October 20, 2020
INVENTOR(S) : Yuan Yuan et al.

Page 1 of 1

It is certified that error appears in the above-identified patent and that said Letters Patent is hereby corrected as shown below:

In the Claims

In Column 34, Claim 7, Line 61, before "mixture" delete "mixed";

In Column 35, Claim 9, Line 10, after "titanium" delete "/zirconium";

In Column 35, Claim 9, Line 11, after "compound carrier" insert --or the spherical zirconium hydrophosphate compound carrier--.

Signed and Sealed this
Twenty-second Day of December, 2020

Andrei Iancu
*Director of the United States Patent and Trademark Office*